June 9, 1925.
P. DOWLING
1,541,333
REPAIRING PANELS OF VEHICLE BODIES
Filed Oct. 11, 1924
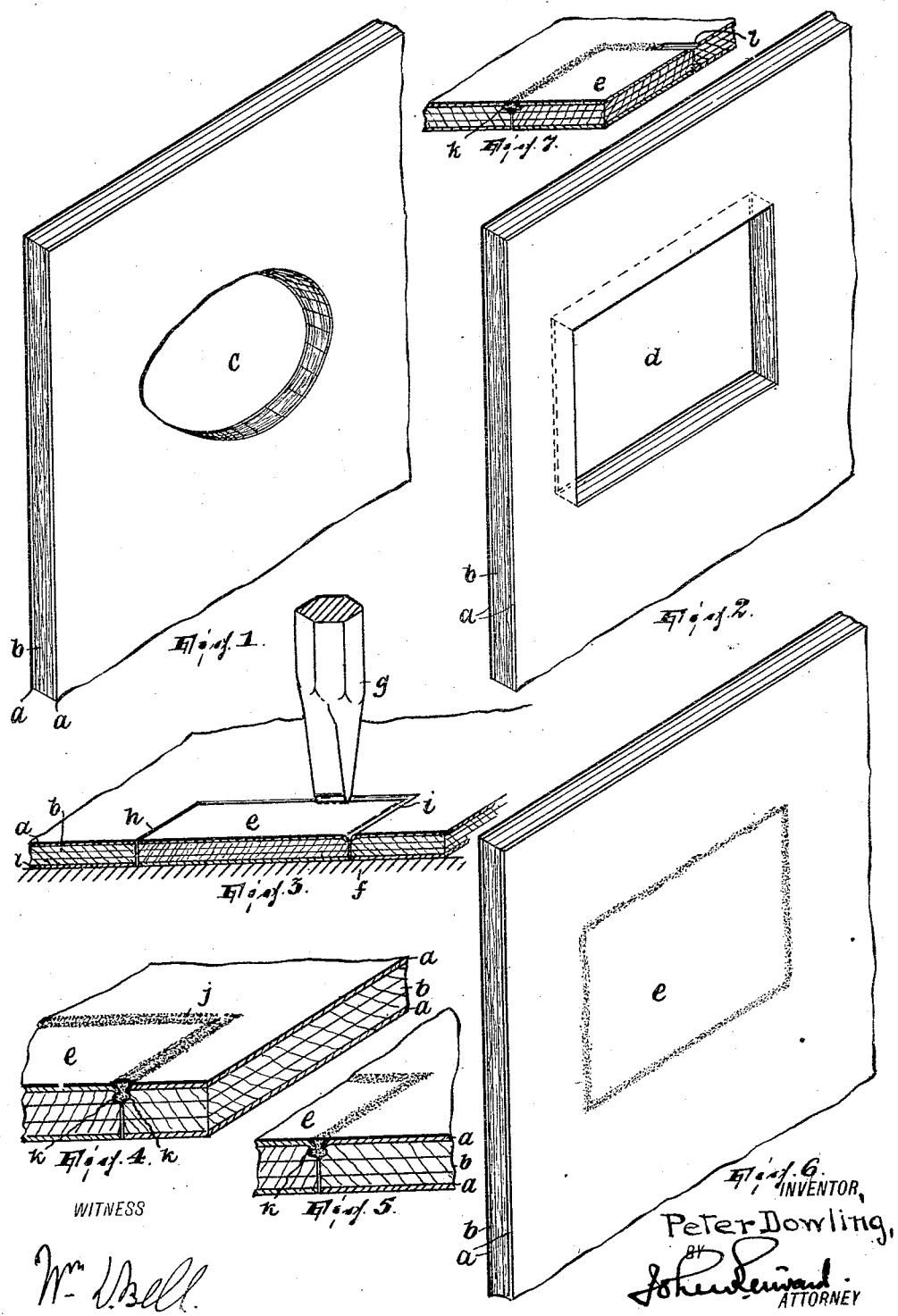

Patented June 9, 1925.

1,541,333

UNITED STATES PATENT OFFICE.

PETER DOWLING, OF PATERSON, NEW JERSEY.

REPAIRING PANELS OF VEHICLE BODIES.

Application filed October 11, 1924. Serial No. 743,170.

*To all whom it may concern:*

Be it known that I, PETER DOWLING, a citizen of the United States, residing at Paterson, in the county of Passaic and State of New Jersey, have invented certain new and useful Improvements in Repairing Panels of Vehicle Bodies, of which the following is a specification.

Panels for vehicle bodies are now usually composed of exterior thin layers of sheet metal (as galvanized iron) and an intervening thickness of a lighter substance, as wood veneer or creosoted paper, all cemented together, the idea being to provide a panel presenting a hard smooth surface suitable to receive an attractive painted finish and not be easily damaged by a blow and which will be strong and yet relatively light in weight. When these panels have been heretofore damaged, as by being dented or having a hole punched in them, it has been regarded as practically impossible to repair them in such a way as to restore the outer surface to the condition of a perfect plane and omit elements that would reveal that the panel had been patched. The object of this invention is to provide a method of patching a damaged panel of the class indicated in such a way that the outer face thereof will be left as a perfect plane and when the same is repainted the panel will not reveal that a patch exists.

In the drawing,

Fig. 1 is a fragment of a panel that has been damaged by having a hole punched therein;

Fig. 2 shows the panel after the portion damaged has been cut away to form a hole of some conventional form convenient for the performance of the method of this invention;

Fig. 3 shows the panel and a patching piece of the same material laid on a suitable support and undergoing the peening step of this invention;

Fig. 4 shows the parts after the uniting substance, as solder, has been applied in the groove that results from the peening operation;

Fig. 5 is a similar view, showing the joint thus formed smoothed off;

Fig. 6 shows the repaired panel; and

Fig. 7 illustrates a modification of the invention.

The panel shown in the drawing consists of two exterior layers $a$ $a$ of thin metal, as galvanized iron, and between them other layers $b$ of some compressible material, such as layers of wood veneer. At $c$, Fig. 1, is shown a hole that has been punched in the panel.

Generally the portion of the panel which includes this hole should be cut away, in the performance of my invention, to leave an aperture $d$ (Fig. 2) of some conventional and convenient form, as rectangular.

Then a piece $e$ of the paneling shaped to fit the aperture is provided and the panel is laid on a suitable support $f$ affording a plane surface, whereupon the piece $e$ is fitted into the aperture in contact with the support, as shown in Fig. 3. The object of this is to provide a backing in the performance of the next step in the method and for maintaining the panel and patching piece in the same plane when they undergo the uniting step.

Then with a chisel $g$ or other suitable tool, whose edge is applied in the crevice $h$ between the patching piece and panel, the edges of the top metal layers of the panel and piece along the crevice are peened down all around, so that a groove $i$ results.

Next with the use of a flux or acid applied to the surface of the groove all around solder $j$ is applied to form a joint between the top metal layers of the panel and patching piece as in Fig. 4. Finally this solder, which should be made to completely fill the groove at least, is smoothed off all around to the plane in which the top surfaces of said top layers lie, as shown in Fig. 5. This completes the work, unless in the case the panel has at each face a metal layer, when if desired the operations of peening, soldering and (if required) smoothing may be repeated at the opposite face.

A salient feature of my invention is the peening step. The metal layer is usually so thin that solder or any other bonding material can not be made to obtain on its mere edge a hold sufficiently effective to maintain the patch in place (against the vibration and jarring which these panels undergo when in use on the vehicle), but when the peening is done there results a broadening of the effective contact surface by as much as the edge portion of each metal layer is peened down.

Another important feature of my method when the bonding material, as solder, is applied in molten form and the thickness $b$ is of material that heat will erode more readily than the metal layers of the panel and patching piece, is that the molten bonding material forms for itself in such thickness $b$ of the panel and patching piece a space $k$ appreciably wider than the crevice left existing between the top metal layers of said panel and patching piece, so that the bonding mass when it sets is as it were locked in place. This is shown in Figs. 4 and 5; it is also shown in Fig. 7 in which this feature of the invention has been illustrated independently of any peening and where it is assumed to be possible if the crevice between the top metal layers of the panel and patching piece is wide enough to insure the bonding material entering the crevice, as by the edge portion of said layers having been removed as shown at $l$.

The invention broadly contemplates fitting the metallic patching piece in the aperture of the metal layer of the panel, then while supporting the panel and patching piece with the latter in the same plane as the metal layer of the former peening inward the metal at their contiguous edge portions and thereby forming a depression, and then depositing a molten bonding substance in said depression.

Having thus fully described my invention, what I claim is:

1. The hereindescribed method of patching an apertured panel having a metal outer layer and compressible material backing the same, which consists in fitting a patching piece of paneling having a metal outer layer and compressible material backing the same into the aperture of the panel and so that the metal layers and the backing material of the panel and piece are in coincident planes, then while supporting the panel and piece peening inward the metal at the contiguous edge portions of the layers and thereby forming a depression, and then depositing a bonding substance in said depression.

2. The hereindescribed method of patching an apertured panel having a metal outer layer and compressible material backing the same, which consists in fitting a metallic patching piece in the aperture of the metal layer, then while supporting the panel and patching piece with the latter in the same plane as the metal layer of the former peening inward the metal at their contiguous edge portions and thereby forming a depression, and then depositing a bonding substance in said depression.

3. The hereindescribed method of patching an apertured panel having a metal outer layer and a backing for said layer which is more erosible by heat than said metal layer, which consists in fitting a metallic patching piece in the aperture of said layer, and then while supporting the panel and patching piece with the latter in the same plane as the metal layer of the former applying molten bonding substance to and between the contiguous portions of said layers, whereby said bonding substance will erode the backing material of the panel and on setting form an interlock between the patching piece and the panel.

In testimony whereof I affix my signature.

PETER DOWLING.